(12) United States Patent
Yamamoto

(10) Patent No.: US 6,467,181 B1
(45) Date of Patent: Oct. 22, 2002

(54) DEVICE FOR MEASURING RADIUS OF GRINDSTONE IN GRINDING MACHINE

(75) Inventor: Masaru Yamamoto, Okayama-ken (JP)

(73) Assignee: Shigiya Machinery Works, Ltd., Fukuyama (JP)

(*) Notice: Subject to any disclaimer, the term of this patent is extended or adjusted under 35 U.S.C. 154(b) by 37 days.

(21) Appl. No.: 09/628,416

(22) Filed: Jul. 28, 2000

(30) Foreign Application Priority Data

Jul. 30, 1999 (JP) .............................. 11-216854

(51) Int. Cl.$^7$ .............................................. G01B 11/08
(52) U.S. Cl. ................................ 33/555.1; 33/DIG. 21; 702/157; 356/635
(58) Field of Search ............................. 33/555.1, 227, 33/228, 275 R, 286, 613, 645, 549, 550, DIG. 21; 702/157; 356/496, 508, 625, 635

(56) References Cited

U.S. PATENT DOCUMENTS

| | | | | |
|---|---|---|---|---|
| 4,866,642 A | * | 9/1989 | Obrig et al. | 702/157 |
| 5,365,672 A | * | 11/1994 | Kato | 33/549 |
| 6,091,503 A | * | 7/2000 | Kuribayashi et al. | 356/635 |
| 6,175,813 B1 | * | 1/2001 | Purchase et al. | 33/555.1 |

* cited by examiner

Primary Examiner—Christopher W. Fulton
(74) Attorney, Agent, or Firm—Venable; John P. Shannon; Chad C. Anderson

(57) ABSTRACT

A radius of a rotating grindstone is specified by a new means with a simple structure out of contact with the rotating grindstone. In a grinding machine that numerically controls a feed shaft (x-axis) of a wheel spindle stock, a device comprises a non-contact detector to detect a rotating grindstone on the wheel spindle stock reaching two different fixed positions in a feed direction of the feed shaft, and an arithmetic means to compute a radius "r" of the rotating grindstone by data detected from the non-contact detector.

10 Claims, 5 Drawing Sheets

DEVICE FOR MEASURING RADIUS OF GRINDSTONE IN GRINDING MACHINE

FIELD OF THE INVENTION

The invention relates to a grinding machine, such as a cam shaft grinding machine and an orbital pin grinding machine, or more particularly, a device for measuring a radius of grindstone in a grinding machine.

DESCRIPTION OF THE RELATED ART

A grinding machine that numerically controls a feed shaft of a wheel spindle stock is known. In this grinding machine, a rotating grindstone moves in a feed direction of the feed shaft to contact and grind a work piece.

During this operation, the rotating grindstone moves back and forth in a direction of the feed shaft to coincide with a distance computed by a control device. For computing the distance, a radius of grindstone is used as a calculating parameter. However, if the radius of the grindstone is not specified exactly, errors arise in the form and circularity of the ground work piece (such as a cam and a pin).

A variety of mechanisms to specify the radius of the rotating grindstone have been proposed in prior art references (such as the Japanese Patent Provisional Publication No. 63678 of 1992 and the Japanese Patent Publication No. 47352 of 1993).

SUMMARY OF THE INVENTION

An object of the invention is to provide a new method and apparatus to specify a radius of a rotating grindstone, or a device for measuring a radius of grindstone in a grinding machine which exactly measures a radius having a simple structure which does not contact the rotating grindstone.

In order to achieve the above-mentioned object, the present invention is characterized by a device for measuring a radius of grindstone in a grinding machine that numerically controls a feed shaft of a wheel spindle stock. The device comprises a non-contact detector to detect a rotating grindstone on the wheel spindle stock reaching two different fixed positions in a feed direction of said feed shaft, and an arithmetic means to compute a radius of the rotating grindstone from points detected by the non-contact detector. In this case, the grinding machine may numerically control the feed shaft and a main shaft having a work piece fixed thereto synchronously.

According to this invention, the non-contact detector detects the rotating grindstone on the wheel spindle stock reaching two different fixed positions, thereby specifying two positions of the rotating grindstone on the feed shaft. The radius of the rotating grindstone is calculated by the arithmetic means with data related to the two positions of the rotating grindstone and their corresponding non-contact positions.

The non-contact detector is movable toward two different detecting positions to detect the rotating grindstone at each position. According to this mechanism, a single non-contact detector is sufficient to detect the rotating grindstone on the wheel spindle stock reaching two different fixed positions.

Moreover, two non-contact detectors can be provided at different detecting positions to detect the rotating grindstone. According to this mechanism, it is not necessary to move the non-contact detectors to detect the rotating grindstone on the wheel spindle stock reaching two different fixed positions.

Furthermore, the non-contact detector is a laser beam detector having a flood-light for radiating a laser beam and a light-interceptor for receiving it. According to this mechanism, the laser beam is intercepted by the rotating grindstone, thereby preventing the light-interceptor from receiving it. As a result, the position of the rotating grindstone is recognized.

DETAILED DESCRIPTION OF THE PREFERRED EMBODIMENT

An explanation follows about a preferred embodiment of the present invention.

Figure 1:
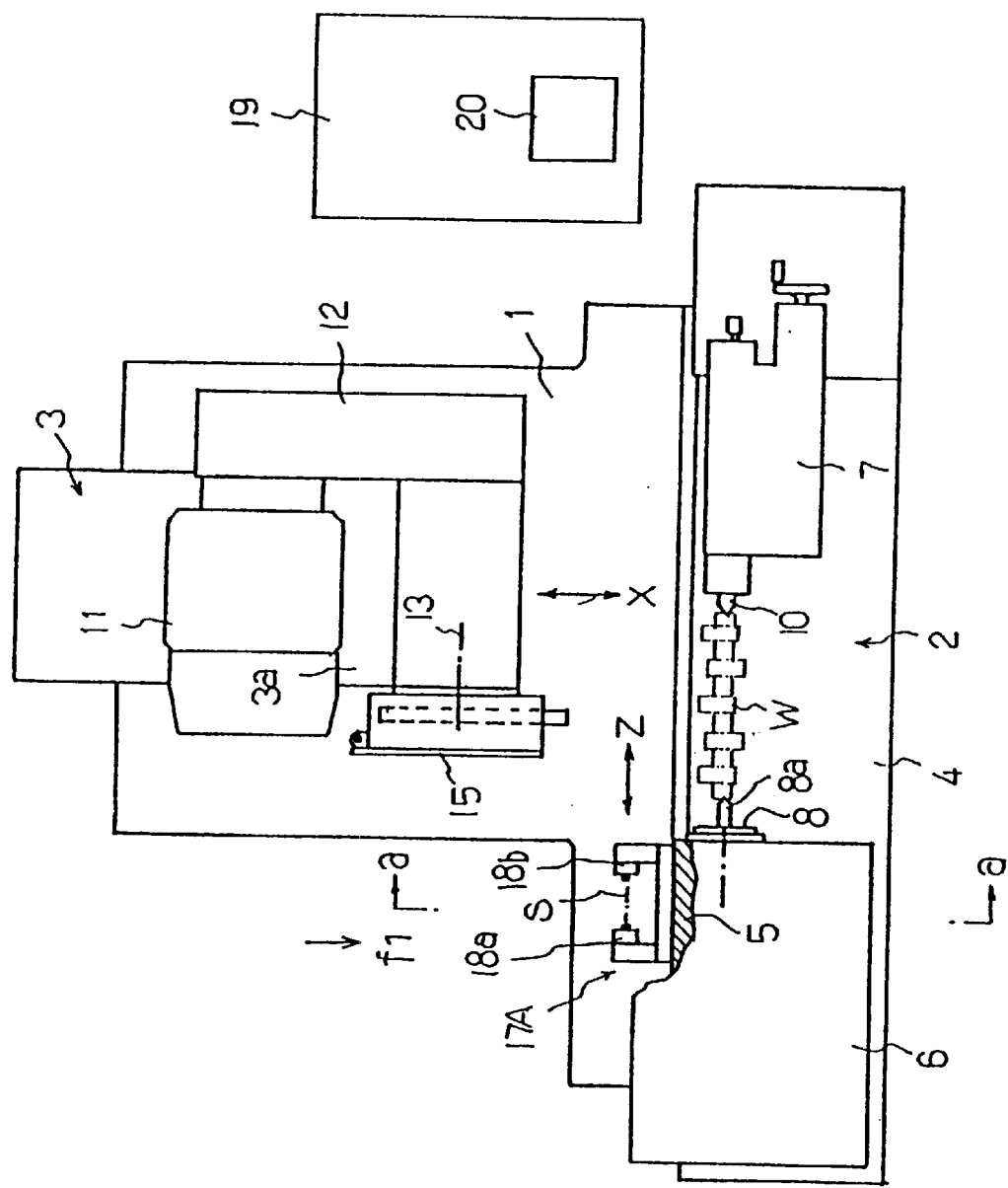
FIG. 1 is a plan view of a grinding machine numerically controlled by computer according to the present invention.

FIG. 1 shows a bed 1, a work table 2, and a wheel spindle stock 3. The work table 2 can be displaced in a z-axis direction by an unillustrated servo-motor for a table feeder on the bed 1, and the wheel spindle stock 3 can be moved in a direction of a feed shaft (x-axis) for the wheel spindle stock on the bed 1.

Figure 2:
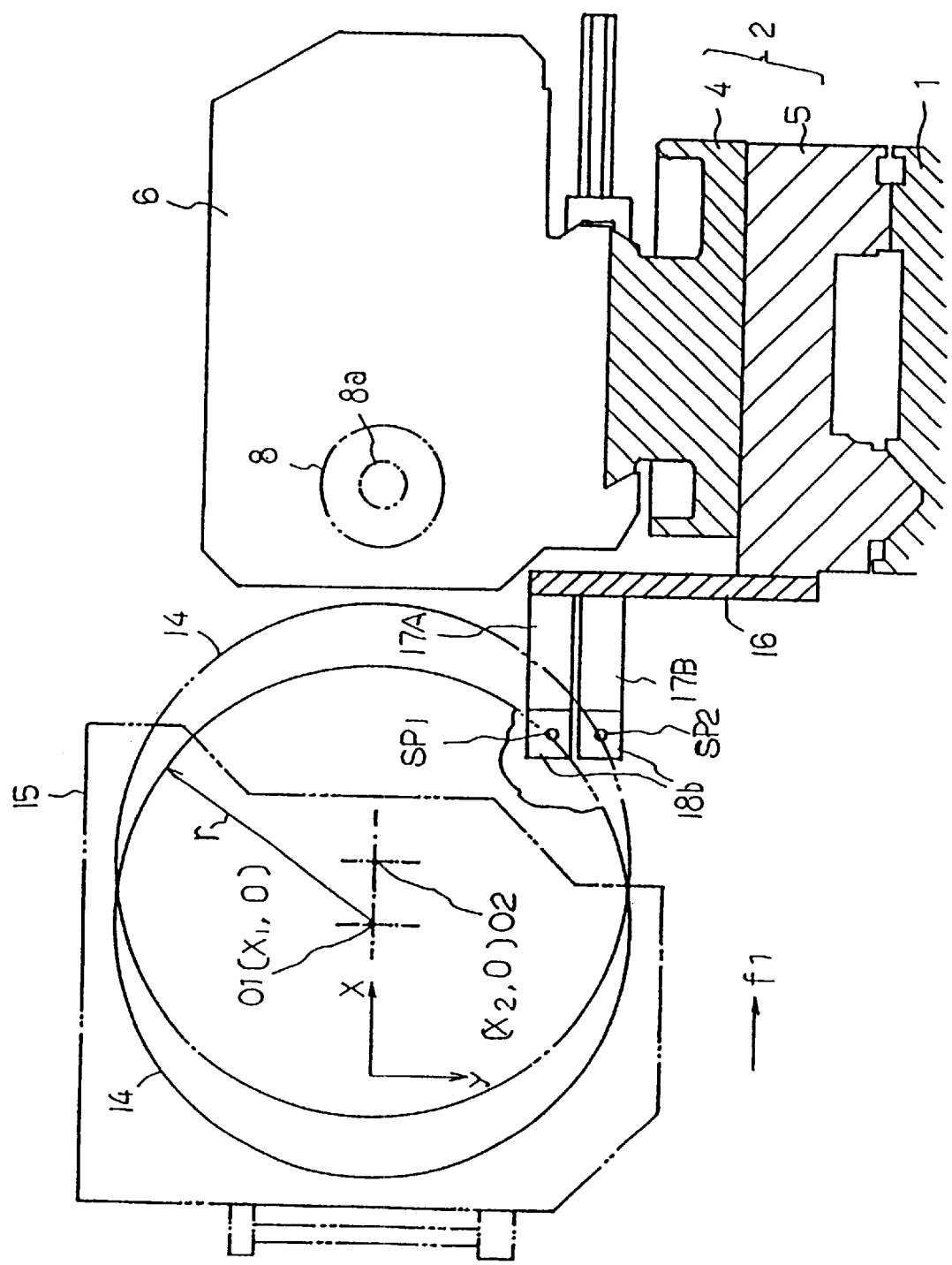
FIG. 2 is a view taken along a line a—a of the grinding machine in FIG. 1.

The work table 2 comprises a top table 4 and a bottom table 5, as shown in FIG. 2. The top table 4 is rotatably displaced around a specific vertical spindle for the bottom table 5. The bottom table 5 is mounted on the bed 1 to be displaced in the z-axis direction. On the top table 4, a spindle stock 6 and a tail stock 7 are installed.

The spindle stock 6 has an unillustrated servo-motor for driving a main shaft 8. A part of the main shaft 8 protrudes to form a spindle center 8a.

The wheel spindle stock 3 is provided with a motor 11 for a wheel spindle and a rotating grindstone 14 on a base 3a mounted on the bed 1 to be displaceable in the x-axis direction. The grindstone 14 is driven by the motor 11 through a transmission mechanism 12 and rotated around a lateral wheel spindle 13 that is supported at a fixed position. A cover body 15 is installed on the rotating grindstone 14 so that it can be opened and closed.

Figure 3:
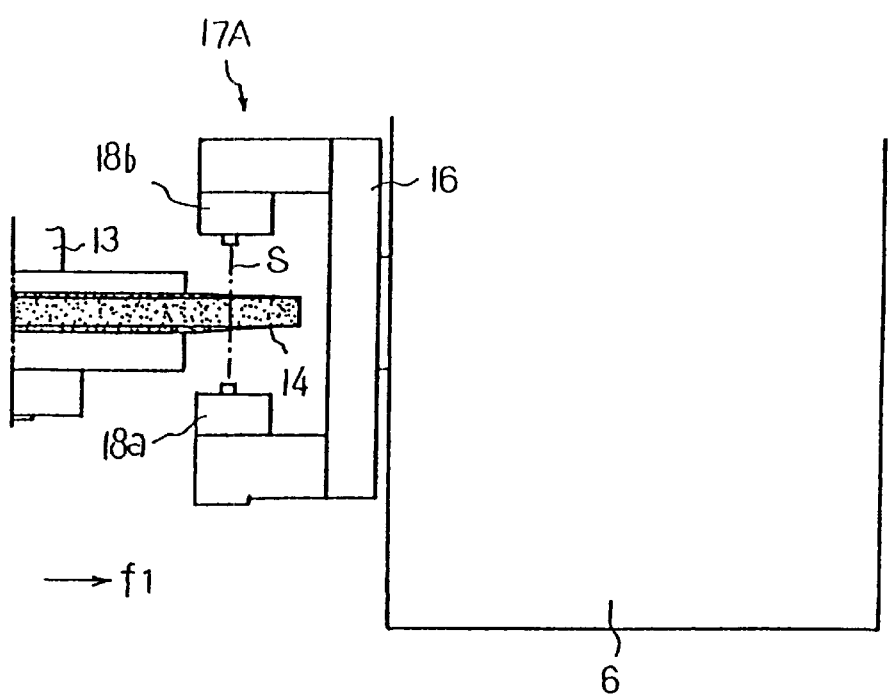
FIG. 3 is a plan view showing a laser beam detector of the grinding machine.

A supporting member 16 is fixed on the side face of the bottom table 5, which corresponds to the side bottom of the spindle stock 6, as shown in FIG. 2. At the upper part of supporting member 16, two laser beam detectors 17A, 17B are fixed in vertical configuration, each of which has a flood-light 18a for radiating a laser beam "s" and a light-intercepter 18b for receiving it, as shown in FIG. 1 and FIG. 3.

Input-output circuits of the laser beam detectors 17A, 17B are incorporated into an electric circuit of a computer numerical control device 19. An arithmetic device 20 is provided for the numerical control device 19 to compute a radius of the rotating grindstone 14 according to data detected from the laser beam detectors 17A, 17B.

An example of grinding a work piece with the grinding machine is described below. Multiple cams "w" are fixed between a spindle center 8*a* and a tail stock center 10 as a work piece. The numerical control device 19 synchronously controls the feeding of the rotating grindstone 14 in the x-axis direction by the feed shaft and rotatively the feeding of the main shaft 8 during rotations of the grindstone 14. Hence the multiple cams "w" is rotatively fed together with the main shaft 8 The rotating grindstone 14 contacts one of the multiple cams "w" during its rotations to grind it. After a series of grinding process, the wheel spindle stock 3 retreats, and the numerical control device 19 operates the unillustrated servo-motor for the table feeder as necessary. Here, the rotating grindstone 14 is moved in the z-axis direction to grind a different cam.

During such grinding operation, the numerical control device 19 uses a radius "r" of the rotating grindstone 14 as a calculating parameter to compute a position of the rotating grindstone 14 on the x-axis direction. For exact grinding, therefore, it is necessary for the numerical control device 19 to recognize the radius "r" as exactly as possible.

Next, the measurement of the radius "r" will be described. The measurement operation starts by an automatic operating command from the numerical control device 19 or a manual start command.

The work table 2 is moved in the z-axis direction during rotations of the grindstone 14 in order to face the z-axis directional center of the laser beam detectors 17A, 17B toward the rotating grindstone 14. Then, the rotating grindstone 14 is moved to a positive side f1 in the x-axial direction. During this movement, when a fringe of the rotating grindstone 14 reaches a laser spot sp1 of the upper laser beam detector 17A, the laser beam "s" from the flood-light 18*a* is interrupted by the fringe, thereby preventing the light-interceptor 18*b* from detecting it. As a result, the laser beam detector 17A detects that the rotating grindstone 14 has reached the laser spot sp1. Then, the arithmetic device 20 specifies a rotation center O1 of the rotating grindstone 14 as coordinates $(x_1, 0)$.

The rotating grindstone 14 is continuously moved in the x-axial positive side f1 direction. During this movement, when the fringe of the rotating grindstone 14 reaches a laser spot sp2 of the lower laser beam detector 17B, the laser beam "s" from the flood-light 18*a* is interrupted by the fringe, thereby preventing the light-interceptor 18*b* from detecting it. As a result, the laser beam detector 17B detects that the rotating grindstone 14 has reached the laser spot sp2. Then, the arithmetic device 20 specifies a rotation center O2 of the rotating grindstone 14 as coordinates $(x_2, 0)$.

If the coordinates of the laser spots sp1, sp2 are $(a_1, b_1)$, $(a_2, b_2)$, respectively, the radius "r" of the rotating grindstone 14 is computed by the following formula (1). This becomes a measurement result.

$$r = [b_1^2 + (b_1^2 - b_2^2 - A^2)^2/4A^2]^{1/2}$$
$$A = (a_2 - a_1) - (x_2 - x_1) \tag{1}$$

The measurement of the radius "r" is carried out at timely intervals, and every result is utilized for computing of the next position of the feed shaft. Hence, the position of the rotating grindstone 14 on the x-axis direction is always numerically controlled by the latest result.

Figure 5:
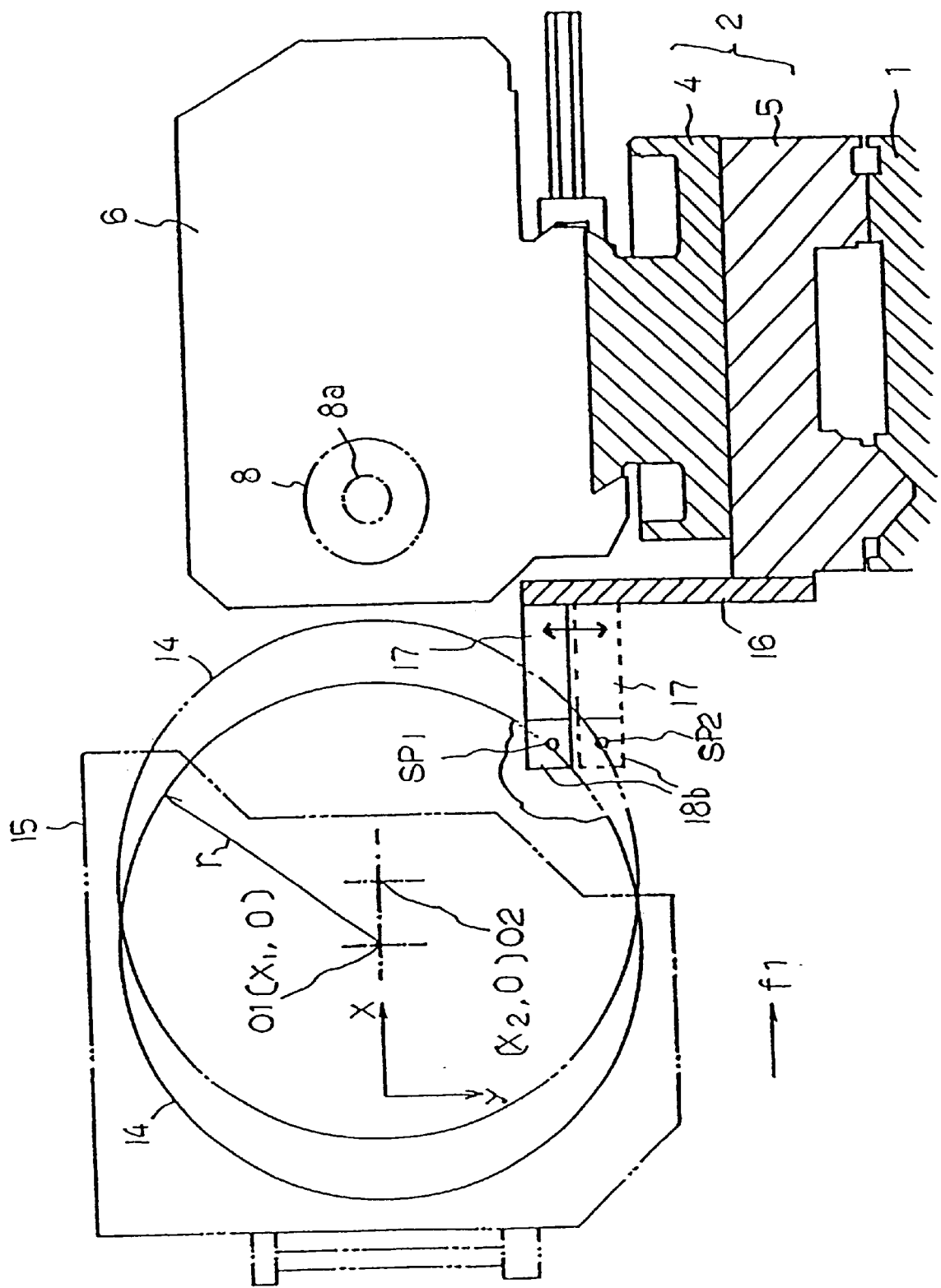
FIG. 5 is an alternate embodiment of the invention showing a view taken along a line a—a of the grinding machine in FIG. 1.

Though two laser beam detectors are provided in the above embodiment, these may be unified into a single device. In this case, the single device is moved so that its laser beam is located at two positions sp1, sp2. FIG. 5 shows a solid-line representation of detector 17 for measuring the first position sp1 and a broken-line representation of the detector moved into position for measuring the second position sp2.

According to this invention, the radius of the rotating grindstone is exactly measured by a new method with an easy structure out of contact with the rotating grindstone.

Figure 4:
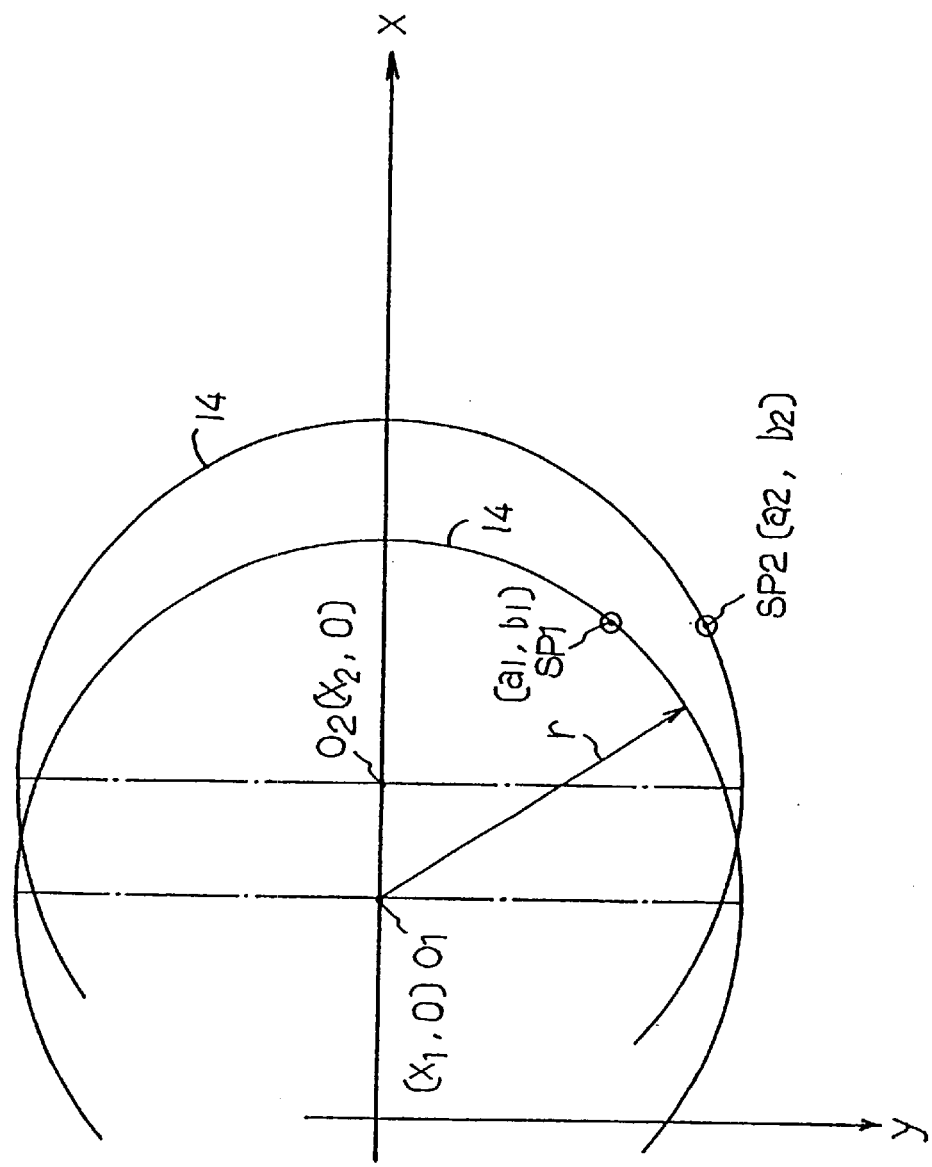
FIG. 4 is an explanatory view showing a relationship between a rotating grindstone and a laser spot of the laser beam detector.

The reason why the radius "r" is determined from the above formula (1) will be explained with reference to FIG. 4. FIG. 4 is an explanatory view showing a relationship between the rotating grindstone 14 and the laser spots sp1, sp2 respectively.

When the laser spot sp1 of the laser beam detector 17A passes the coordinates $(a_1, b_1)$, a circle equation confined by the fringe of the rotating grindstone 14 is shown as the following formula (2), since coordinates of the center of the circle are $(x_1, 0)$.

$$(x - x_1)^2 + y^2 = r^2 \tag{2}$$

Since the circle shown by this formula (2) passes the coordinates $(a_1, b_1)$ of the laser spot, the following formula (3) is formed.

$$(a_1 - x_1)^2 + b_1^2 = r \tag{3}$$

When the laser spot sp2 of the laser beam detector 17B passes the coordinates $(a_2, b_2)$, a circle equation confined by the fringe of the rotating grindstone 14 is shown as the following formula (4), since coordinates of the center of the circle are $(x_2, 0)$.

$$(x - x_2)^2 + y_2^2 = r^2 \tag{4}$$

Since the circle shown by this formula (4) passes the coordinates $(a_2, b_2)$ of the laser spot, the following formula (5) is formed.

$$(a_2 - x_2)^2 + b_{22} = r^2 \tag{5}$$

Besides, the following formula is led by the formula (3).

$$a_1 - x_1 = (r^2 - b_{12})^{1/2} \tag{6}$$

Then, the following formula is led by the formula (5).

$$a_2 - x_2 = (r^2 - b_2^2)_{1/2} \tag{7}$$

Subtracting the formula (6) from the formula (7) gives the following formula (8).

$$(a_2 - a_1) - (x_2 - x_1) = (r^2 - b_2^2)^{1/2} - (r_2 - b_{12})^{1/2} \tag{8}$$

Supposing $A = (a_2 - a_1) - (x_2 - x_{.1})$, the formula (8) is rewritten as follows.

$$(r^2 - b_1^2)^{1/2} = A + (r^2 - b_2^2)^{1/2}$$

Squaring both sides of this formula gives $$r^2 - b_1^2 = A^2 + 2A(r^2 - b_2^2)^{1/2} + r^2 - b_2^2$$

Arranging this gives $$2A(r^2 - b_2^2)^{1/2} = b_1^2 - b_2^2 + A^2.$$

Arranging this again gives $$(r^2 - b_2^2)^{1/2} = (b_1^2 - b_2^2 + A^2)/2A.$$

Squaring both sides of this formula gives $$r^2 - b_1^2 = (b_1^2 - b_2^2 + A^2)^2/4A^2.$$

Arranging this gives $$r^2 = b_1^2 + (b_1^2 - b_2^2 + A^2)^2/4A^2.$$

From this formula, the above formula (1) for computing the radius "r" of the rotating grindstone 14 is led.

$$r = [b_1^2 + (b_1^2 - b_2^2 + A^2)^2 / 4A^2]^{1/2}$$

$$A = (a_2 - a_1) - (x_2 - x_1)$$

From this formula, the above formula (1) for computing the radius "r" of the rotating grindstone 14 is led.

That is;

$$r = [b_1^2 + (b_1^2 - b_2^2 + A^2)^2 / 4A^2]^{1/2}$$

$$A = (a_2 - a_1) - (x_2 - x_1)$$

What is claimed is:

1. A device for measuring a radius of grindstone in a grinding machine that numerically controls a feed shaft of a wheel spindle stock, the device comprising:
    a non-contact detector to detect a rotating grindstone on the wheel spindle stock reaching two different fixed positions in a feed direction of said feed shaft, and
    an arithmetic means to compute a radius of the rotating grindstone by data detected from said non-contact detector.

2. A device for measuring a radius of grindstone in a grinding machine according to claim 1:
    wherein said non-contact detector is movable toward two different detecting positions to detect the rotating grindstone at each position.

3. A device for measuring a radius of grindstone in a grinding machine according to claim 1:
    wherein non-contact detectors are provided at two different detecting positions to detect the rotating grindstone there.

4. A device for measuring a radius of grindstone in a grinding machine according to claim 1:
    wherein said non-contact detector is a laser beam detector having a flood-light for radiating a laser beam and a light-interceptor for receiving it.

5. A device for measuring a radius of grindstone in a grinding machine that numerically controls a feed shaft of a wheel spindle stock and a main shaft having a work piece fixed thereto synchronomously, the device comprising:
    a non-contact detector to detect a rotating grindstone on the wheel spindle stock reaching two different fixed positions in a feed direction of said feed shaft, and
    an arithmetic means to compute a radius of the rotating grindstone by data detected from said non-contact detector.

6. A method for measuring a radius of a rotating grindstone in a grinding machine that controls a feed shaft of a wheel spindle stock, the method comprising:
    detecting, with at least one non-contact detector, the rotating grindstone on the wheel spindle stock in a first position relative to a feed direction of the feed shaft;
    moving the rotating grindstone into a second position, different from said first position relative to the feed direction of the feed shaft;
    detecting, with the at least one non-contact detector the rotating grindstone in the second position; and
    computing the radius of the rotating grindstone from data detected in the detecting steps.

7. The method according to claim 6, further comprising controlling the feed shaft of the wheel spindle stock synchronously with a main shaft having a work piece fixed thereto synchronously.

8. The method according to claim 6, wherein the detecting steps are performed by a single non-contact detector, the method further comprising, after detecting the rotating grindstone in the first position, moving the single non-contact detector to detect the rotating grindstone in the second position.

9. The method according to claim 6, wherein detecting the rotating grindstone in the first position is performed by a first non-contact detector, and detecting the rotating grindstone in the second position is performed by a second non-contact detector.

10. The method according to claim 6, wherein the detecting steps are performed by radiating a laser beam and receiving the laser beam with a light interceptor.

* * * * *